July 22, 1930.  W. C. TROUT  1,771,103
PITMAN
Filed Nov. 22, 1926    2 Sheets-Sheet 1
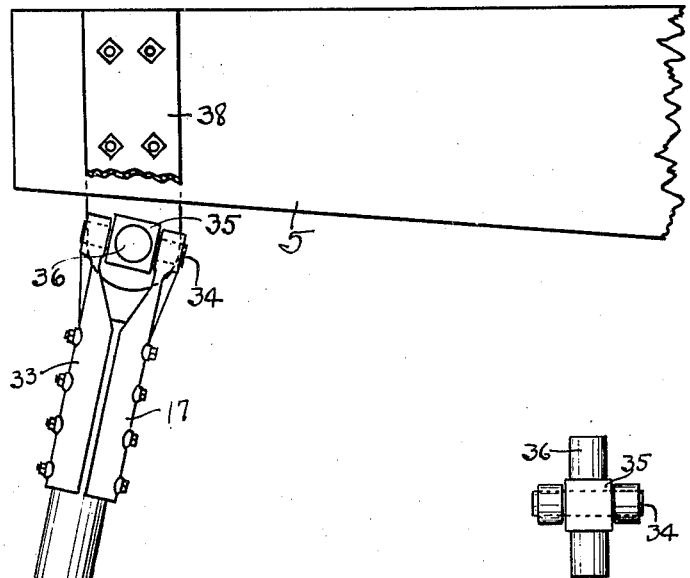
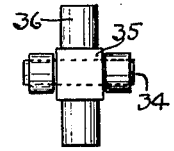
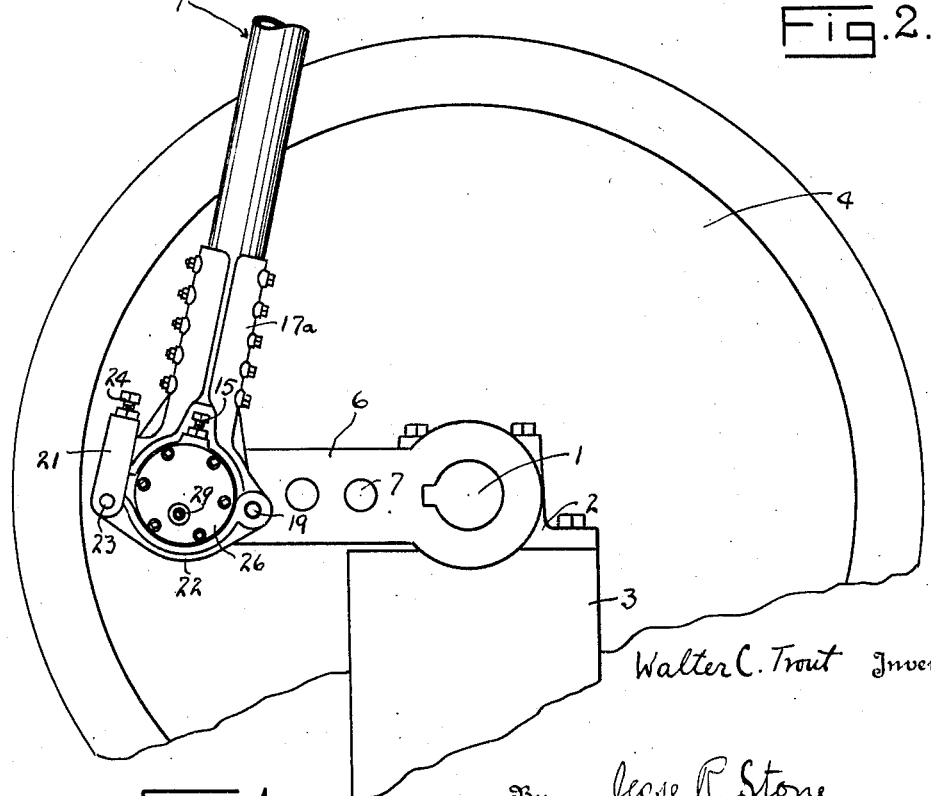
Fig.2.
Fig.1.
Walter C. Trout  Inventor
By Jesse R. Stone
Attorney July 22, 1930. W. C. TROUT 1,771,103
PITMAN
Filed Nov. 22, 1926 2 Sheets-Sheet 2

Walter C. Trout Inventor

By Jesse R. Stone

Attorney

Patented July 22, 1930

1,771,103

UNITED STATES PATENT OFFICE

WALTER C. TROUT, OF LUFKIN, TEXAS

PITMAN

Application filed November 22, 1926. Serial No. 149,866.

My invention relates to pitmen or connecting rods and is particularly adapted for use in communicating a reciprocating motion to a walking beam, such as is employed in standard pumping and drilling rigs in oil field work.

In the use of standard rigs in oil field work, it is the custom to rock the walking beam upon its pivot through a pitman attached at one end thereof, the other end of said pitman being connected with a crank arm upon a shaft to which rotary motion is communicated. It is difficult under the conditions in which these installations are made to so mount the crank shaft and the crank arm thereon relative to the walking beam that there will be accurate alignment between the crank arm and the walking beam, which is to be actuated. The parts easily get out of alignment, and when this occurs a strain is placed upon the pitman and the crank arm, causing excessive wear and damage to the equipment.

It is an object of the invention to provide a pitman for connection between the walking beam and the wrist pin upon the crank arm of the operating shaft, which will allow lateral movement or inclination of the pitman relative to the crank arm and walking beam without in any way placing a strain upon the bearings.

It is also an object to provide means to allow the pitman to be readily detached from the wrist pin when occasion arises. It is also desired to allow the bearing upon the wrist pin to remain in place thereon when the pitman is detached, and the invention contemplates a construction of this kind. Other objects and advantages reside in the particular construction and arrangement of the parts, and will be more particularly brought out hereafter.

Figure 4:
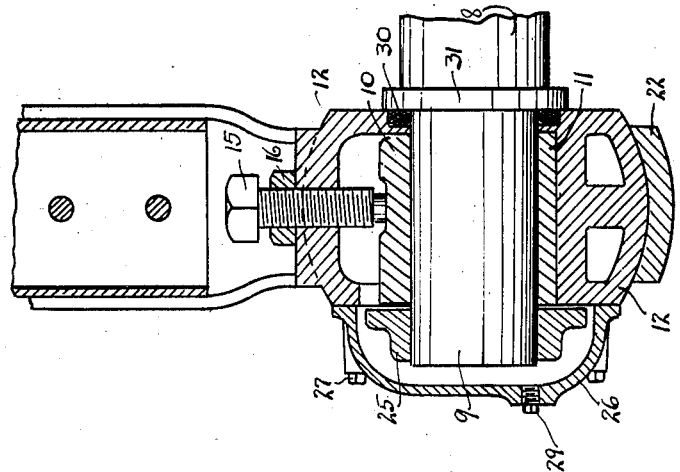
Figure 3:
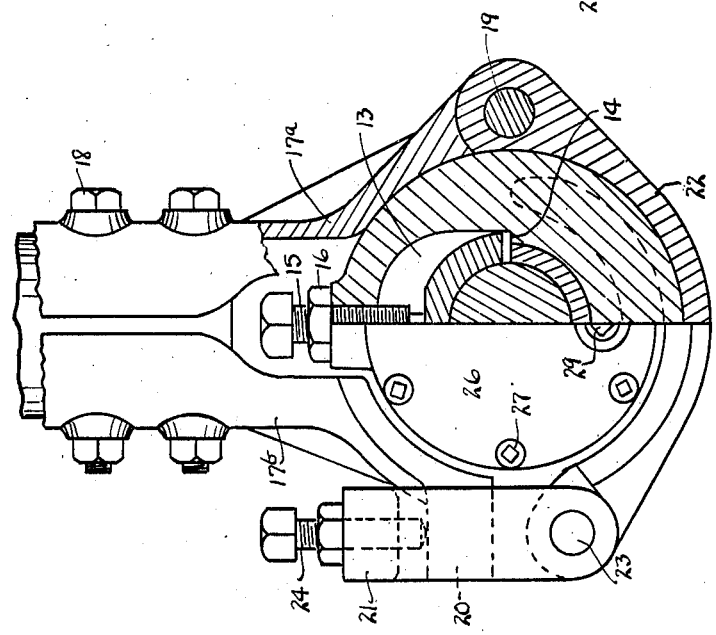
Figure 5:
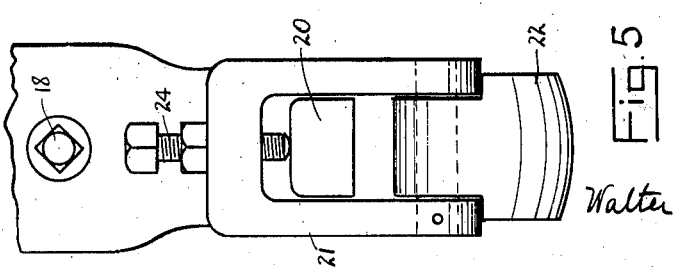

Referring to the drawing herewith, Fig. 1 is a broken side elevation, showing the use of a pitman involving my invention, certain parts being broken away for greater clearness. Fig. 2 is a top plan view of a universal yoke, by means of which the pitman may be attached to the walking beam. Fig. 3 is a side view, partly in elevation and partly in vertical section, illustrating the construction of the lower end of the pitman, and its attachment to the wrist pin. Fig. 4 is a section through the lower end of the pitman and the bearing, illustrating the construction of the attaching means between the pitman and the wrist pin. Fig. 5 is an elevation of the lower end of the pitman taken at right angles to the view shown in Fig. 3. Like numerals of reference are employed to designate like parts in all the views.

In Fig. 1 I have shown the usual operating shaft 1 in bearings 2 upon jack posts 3. On said shaft is the usual band wheel 4, by means of which rotary motion may be communicated to the crank shaft 1. The walking beam 5, which is to be reciprocated or rocked upon its pivot, is shown in vertical section.

The crank shaft 1 has a crank arm 6 thereon provided with a plurality of openings 7 for attachment thereto of a wrist pin 8. Said wrist pin furnishes attachment for the lower end of the pitman, shown generally at 39.

As shown particularly in Figs. 3 and 4, the wrist pin 8 is formed with a reduced end 9 to receive a bearing for the pitman. Said bearing is made up of an upper bushing 10 of some bearing metal, such as babbitt or bronze, and a lower bushing 11 of similar material fitting on the lower side of the wrist pin. The two bearing bushings 10 and 11 are held in position around the shaft by a bearing block 12. Said block is generally ring shaped, having an inner recess or opening 13 to receive the bearing bushings 10 and 11. The lower side of the opening 13 is of sufficient diameter to receive the wrist pin 9 and the lower bushing 11, which is a comparatively thin section. Above the edge of the lower bushing 11 of the bearing, the recess is enlarged to provide a shoulder 14 upon which the upper bushing 10 may fit. Above the upper bearing bushing 10 there is a space to provide movement for the upper bearing bushing. A set screw 15 is extended downwardly through the upper side of the bearing block and rests against the upper bearing section, and is adapted to hold the section adjustable against the wrist pin. The lock nut 16 on said screw serves to hold it in adjusted position.

The outer periphery of the bearing block is convex between its ends to provide a curved outer face to be received within a yoke on the lower end of the pitman. Said yoke is made up of two opposite plates 17ª and 17ᵇ curved to fit about the pitman body 9 and adapted to be secured to the pitman by means of through bolts 18. The lower ends of said plates are forked laterally and one plate 17ª has approximately midway of the bearing block an opening to receive a hinge pin 19. The inner face of the plate adjacent the bearing block is concave to fit the curved outer face of the block.

The opposite plate 17ᵇ is also curved laterally and provided with a laterally projecting lug, shown in dotted lines at 20, to engage with a swinging clevis or latch member 21.

A lower gate 22 is pivoted at one end upon the pin 19 and curved to fit the lower side of the bearing block, its opposite end having a transverse pin 23 therein to which is secured the clevis 21. The said clevis is U-shaped, the central portion of which has a set screw 24 which may be adjusted through said clevis against the shoulder 20 upon the plate 17ᵇ to latch the lower gate against the bearing block and hold it in position. A space is provided between the two plates 17ª and 17ᵇ to allow access to the set screw 15, as will be readily noted from Fig. 3.

The outer end of the wrist pin 9 has a washer 25 thereon, which may be secured in place by any desirable means to retain the bearing sections in position. Outside of the wrist pin and closing the space about the end thereof is a plate 26 secured by means of a series of screws 27 to the bearing block 12. A chamber is thus constructed surrounding the end of the wrist pin within which lubricant may be placed to assure that the bearings be constantly lubricated. An opening may be provided in the plate 26 to receive a threaded plug 29, through which lubricant may be furnished into the chamber. It is contemplated that a ring 30 of packing material may be placed about the wrist pin 9 in the face of the bearing block adjacent the radial flange 31 on said wrist pin. This will prevent leakage of the lubricant at that point.

The upper end of the pitman is provided with a universal bearing, by means of which it is secured to the walking beam 5. Said walking beam has plates 38 at its sides extending below the beam and formed with openings within which the upper end of the pitman may be pivoted. The pitman has two side plates 33 thereon, the ends of which are beyond the body of the pitman and are spaced and provided with openings to receive the ends 34 of a bearing yoke 35. Said yoke has two arms 36 at right angles to the arms 34, said arms 36 having a bearing in the plates 38 on the walking beam, and thereby allowing a movement of the pitman in the plane of the walking beam. The pivotal connection furnished between the upper end of the pitman and the arms 34 allows swinging of the pitman at right angles to the plane of the walking beam, thus providing universal movement and smooth operation of the device even when the walking beam is out of alignment with the crank arm.

When the upper end of the pitman is moved in a direction at right angles to the plane of the walking beam, there will be a movement of the lower yoke, including the two plates 17ª and 17ᵇ and the member 22, upon the outer approximately spherical surface of the bearing block 12, and as will be apparent, it will not exert a binding action upon the bearing and will not interfere with its smooth running action. Another advantage of the device lies in the manner in which the pitman may be detached relative to the crank arm when the crank shaft is to be used for other purposes. When detachment is desired, the set screw 24 is loosened slightly and the clevis 21 may then be swung free from the upper shoulder of the member 20, thus allowing the lower portion 22 of the yoke to drop away from the bearing block, leaving the bearing block upon the wrist pin. It will, therefore, not be necessary to detach the bearing when the wrist pin is released from the pitman. This will also make it easy to obtain access to and adjust the bearing members 10 and 11 whenever adjustment is necessary. The complete enclosure of the bearing so as to hold lubricant is also a feature of value.

Having thus described my invention, what I claim as new and desire to protect by Letters Patent is:

1. In a pitman connection the combination of a releasable bearing support member, a bushing support block engaged by said member, a thin bushing carried by said block, a thick bushing carried by said block and a shoulder on said block adapted to engage said thick bushing.

2. In a pitman connection the combination of a releasable bearing support member, a bushing support block engaged by said member, a thin bushing carried by said block, a thick bushing carried by said block and a shoulder on said block adapted to engage said thick bushing, and a packing carried by said support member and adapted to engage the wrist pin.

3. A pitman, means for connecting one end thereof with a wrist pin comprising a bearing block having an approximately spherical outer surface, bushings between said block and said wrist pin, opposite plates at the end of said pitman, a releasable gate pivoted to one of said plates and a latch on said gate to engage the other of said plates, said plates and gate shaped to fit said bearing block, a set screw carried by said bearing block and engaging said bushing and a lubricant container carried by said block member.

In testimony whereof I herenuto affix my signature this 15th day of November, A. D. 1926.

WALTER C. TROUT.